June 11, 1963   Z. M. ROEHR   3,093,134
NEEDLE WITH MOLDED HUB
Original Filed July 25, 1957   2 Sheets-Sheet 2
 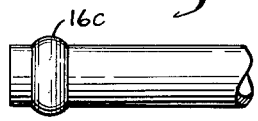
 
 
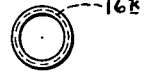 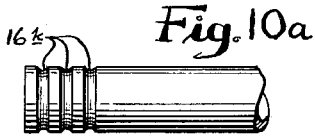
 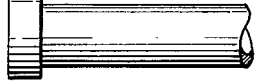
 
 
 
INVENTOR
ZBISLAW M. ROEHR
by: Morris Spector
ATTY.

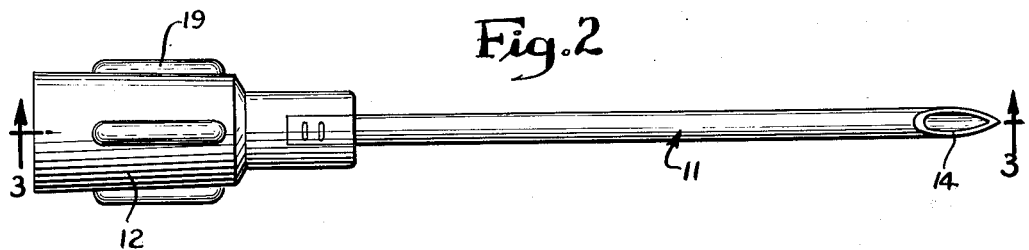
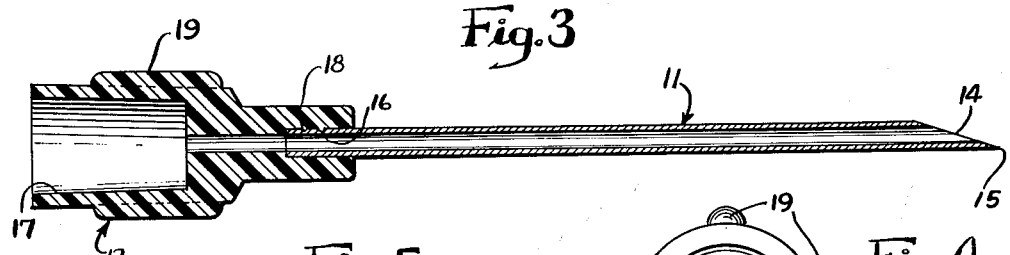
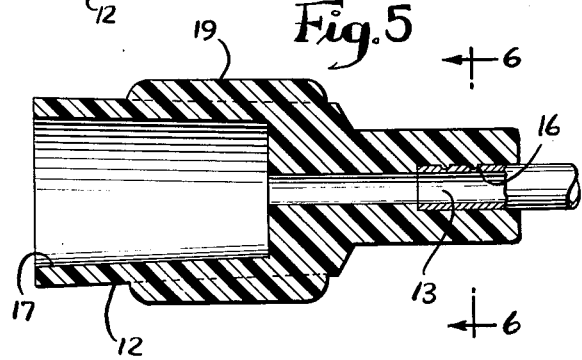
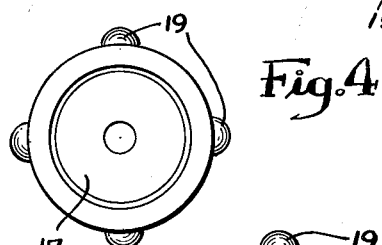
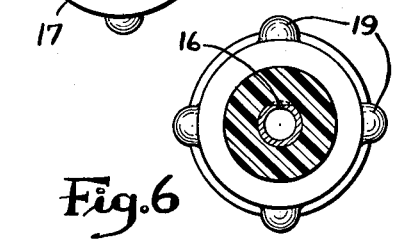

United States Patent Office 3,093,134
Patented June 11, 1963

3,093,134
NEEDLE WITH MOLDED HUB
Zbislaw M. Roehr, Deland, Fla., assignor, by mesne assignments, to Brunswick Corporation, a corporation of Delaware
Continuation of application Ser. No. 674,224, July 25, 1957. This application Jan. 19, 1959, Ser. No. 787,775
12 Claims. (Cl. 128—221)

This application is a continuation of my co-pending application Serial No. 674,224 filed July 25, 1957, and now abandoned.

This invention relates to needles variously used in surgery, particularly of the type wherein the needle includes a cannula secured to a molded hub.

Needles of this character comprise a very small diameter elongated and sharp pointed cannula secured to a hub or ferrule. In the production of needles of this type, it is necessary so to anchor the cannula to the hub as to insure against all possible accidental alteration of their axial relationship.

The primary problem encountered in molding plastics about a tubular insert is to obtain a grip so that the plastic will not separate from the insert when in use. In the manufacture of hypodermic needles with plastic hubs, it is particularly important to obtain a very firm and permanent grip between the cannula and the hub. Some have even proposed inserting the cannula into a previously molded hub, and form a compression fit therebetween to maintain the required grip. Those methods that have heretofore been used, to the applicant's knowledge, with varying degrees of success, all have limitations as to the type of plastic which can be used and mechanical limitations as to their effectiveness.

The main objects of this invention are to provide an improved manner of anchoring to each other the cannula and hub of a surgical needle; to provide an improved manner of anchoring the cannula and hub of a surgical needle which permits the hub to be molded plastic; to provide an improved cannula-hub anchoring which is economical to produce and which precludes reasonable possibility of an accidental alteration of their relationship; and to provide an improved cannula-hub anchoring of this kind wherein the anchor of the cannula is so correlated with the tapered open end of the cannula and is visible through the hub, thereby indicating the angular orientation of the tapered cannula end.

The above objects of the present invention are attained in the preferred embodiment here illustrated by providing one or more projections in the side wall of the tubing constituting the cannula at the end of the tubing that is to be covered with plastic. The plastic is molded around the end of the tubing in such a manner that during the molding operation, the projection or projections are surrounded by the plastic, or the plastic enters into depressions formed in the periphery of the cannula.

A problem often faced by physicians in making hypodermic injections is that it is necessary to determine the orientation of the needle bevel after the same has been inserted into the flesh. By making the plastic of transparent material (or even translucent) the physician can determine the orientation of the needle bevel by observing the corresponding orientation of the projection on the cannula within the transparent or translucent hub.

The attainment of the above and further objects of the present invention will be apparent from the following specification taken in conjunction with the accompanying drawing forming a part thereof.

In the drawings:

FIGURE 1 is an enlarged side view of a cannula constructed in accordance with this invention, before anchoring in a plastic hub;

FIG. 2 is an enlarged side view of the assembled cannula and hub;

FIG. 3 is a longitudinal sectional view of the same;

FIG. 4 is a left hand end view of FIG. 5;

FIG. 5 is a further enlarged, longitudinal, sectional view of the hub and the embedded end of the cannula;

FIG. 6 is a sectional view taken along the line 6—6 of FIG. 5 and looking in the direction of the arrow;

FIGS. 7a through 14a are, respectively, fragmentary side views of different modifications of cannulae corresponding to the cannula of FIG. 1;

FIGS. 7b through 14b are, respectively, end views of the corresponding cannulae of FIGS. 7a through 14a, in each instance the figure number with the b subscript being an end view of the figure having the same numeral with an a subscript.

In the accompanying drawings like reference numerals designate like parts throughout.

One essential concept of this invention involves a cannula embedded in a plastic hub and keyed thereto either by reason of the cannula having an outward projection around which the hub is molded or the cannula having a depression or recess into which molded hub material enters.

A needle embodying the foregoing concept comprises a cannula 11 and a hub 12 assembled to permit use thereof as an accessory to varying types of instrument either for the administration of substances to a patient or for the extraction of a fluid from a patient.

The cannula 11 is conventionally formed of a long, slender, small diameter tube usually of high grade stainless steel, with a lumen 13 extending the full length thereof. The administering end of the cannula 11 is tapered at 14, in the usual manner, to form a penetrating point 15. Inwardly from the opposite blunt end the cannula has a peripheral section with the indentations 16 in line with one another and in line with the taper 14. The indentations are positioned inwardly from the blunt end a distance such that the indentations are exposed to view through the stem of the hub 12, namely, at a point in the smaller diameter of the hub.

The hub 12 is plastic, for instance, cellulose acetate, anchored to the blunt end of the cannula. The larger portion of which hub 12 is formed with a tapered socket or cavity 17 into which is adapted to be telescoped the end of a tube or syringe, for instance, of the Luer type, or other instrument which requires a needle of this kind for its appropriate use. The taper of the socket 17 is a standard Luer taper, that is a taper of 0.060 inch per inch. In one construction the inside diameter of the socket 17 was .169 inch at its outer end and .154 inch at an axial distance of .250 inch from the outer end. These dimensions are given merely by way of illustration, it being understood that the invention is not limited thereto. The remaining portion of the hub 12 is solid and embraces the blunt end of the cannula 11. A portion of the plastic extends into the indentations 16 and forms a key 18 whereby the cannula and hub are so anchored together as to preclude reasonable possibility of an accidental axial or circumferential alteration of their relationship, notwithstanding the uses to which the needle may be subjected.

When the hub 12 is a transparent plastic, which is preferred, the indentations 16 are visible through the hub. The indentations 16 being in alignment with the taper 14, make it possible for the user of such a needle to determine the disposition of the tapered end though hidden from view. In addition, in some uses of the needle the user may observe the existence of flow of liquid through the needle by observation through the transparent hub at the left hand end of the cannula as seen in FIGURES 2, 3 and 5.

In the embodiment of the invention here shown, the cannula is firmly anchored in the hub, being held by the entrance of molded plastic or key 18 against both longitudinal and axial movement. Because the plastic is transparent the operator using the needle can tell, by looking at the hub, the direction of the tapered end 14. This is often important in instances wherein the tapered end after it has been positioned in the flesh, must retain that position against rotary motion even though the tapered end is no longer in view.

If desired, the hub may be made of non-transparent plastic in which event an additional indentation like the indentation 16 would be at a portion of the cannula outside of and immediately adjacent to the hub.

In the embodiments illustrated in FIGURES 7a through 14a only the anchoring end of the cannula is shown. The rest of the cannula is, in each instance, of a construction substantially the same as the cannula 11 of FIGURE 1, being formed of a long, slender small diameter tube of stainless steel or the like, having a lumen therethrough like the lumen 13 of the embodiments of FIGURES 1, 2 and 3, and having a beveled penetrating point at one end, and the opposite end, which is the end shown in FIGURES 7a through 14a, being adapted to have a hub molded therearound like the hub 12. The differences between the ends of the cannulae of FIGURES 7a through 14a and that of FIGURE 4 being in the manner of locking the hub to the respective cannulae, it being understood that each cannula of FIGURES 7a through 14a is to have a hub molded thereon at the end illustrated, as heretofore described, the hub in each case being, preferably, a transparent plastic as set forth.

The cannula of FIGURES 7a and 7b differs from that of FIGURE 1 in that here there is provided a peripherally extending projection 16c that corresponds to the indentation 16 of FIGURE 1. The projection 16c extends through an arc of 360°. If visible observation is desired, the projection 16c may extend through an angle slightly less than 360°, the place of no projection being in longitudinal alignment with the bevel 14 of the needle. If desired, the projection 16c may extend through a very small peripheral extent and be located in longitudinal alignment with the bevel 14.

In the embodiment illustrated in FIGURES 8a and 8b the cannula is provided with a projecting spot of solder 16h that is soldered to the cannula and projects outwardly therefrom for anchoring the cannula in the hub that is to be molded around it. The projecting spot of solder is in longitudinal alignment with the taper 14.

In FIGURES 9a and 9b a like result is obtained by forming one or more outwardly extending irregular projections 16j—16j integral with the cannula wall. These projections may be made in any desired manner, as, for instance, by an electric arc. The projections anchor the cannula in the hub that is to be molded around it and may be so oriented angularly around the periphery of the cannula that the taper 14 is centered between the two projections illustrated in FIGURE 9b.

In the cannula of FIGURES 10a–10b the anchoring means is provided by forming peripherally extending grooves 16k, each of which may extend through 360°, or through a smaller arc around the periphery of the cannula. These grooves provide an anchor for the plastic hub, against axial movement, and when they extend through an arc less than 360° they also key the cannula and hub together against relative radial movement, and the interruptions in the grooves 16k may all be in alignment with the taper 14.

In the embodiment illustrated in FIGURES 11a and 11b a metal ring 16m is applied over the end of the cannula about which the hub is molded. This ring may be secured over the end of the cannula by press fitting the same thereover or by forming a solder or welded joint between the ring and the cannula, or by a combination of such a joint with a press fit.

In the embodiment illustrated in FIGURES 12a and 12b, a crimp 16n is formed in the end of the cannula for keying the cannula to the hub to be molded therearound.

In the embodiment illustrated in FIGURES 13a and 13b the cannula is held against rotation in the hub that is to be molded therearound by deforming the periphery of the end of the hub from a circular or cylindrical shape to a non-circular shape such as, for instance, an oval as indicated at 16p. This deformation may be at the very end of the cannula. At a small distance from the end of the cannula, the cannula remains round in cross section.

In the embodiment illustrated in FIGURES 14a and 14b there is applied to the outer surface of the end of the cannula a pigmented bonding agent 16q, which is in axial alignment with the bevel at the opposite end of the cannula. The pigment being visible through the transparent plastic hub serves to indicate the orientation of the beveled end of the cannula, whereas the bonding properties facilitate interlocking of the cannula with the plastic hub to be molded thereabout.

In each of the embodiments herein illustrated the plastic used may be a transparent or translucent plastic as above set forth. Where an indication through the plastic is not relied upon, the visible indication may be obtained by the application, in those instances, of a marker at the end of the cannula outside of but immediately adjacent to the hub, which marker is properly oriented with respect to the beveled surface of the needle.

In compliance with the requirements of the patent statutes I have herein shown a number of preferred embodiments of the present invention. It is to be understood that the invention is not limited to those precise embodiments, the same being merely illustrative of the principles of the invention. What is considered new and sought to be covered by Letters Patent is:

1. A needle of the class described comprising a cannula having a lumen and, at one end, a tapered penetrating point with an opening therein from the lumen and a light-pervious hub anchored thereto at a section of the cannula spaced axially from said penetrating point, said cannula having means localized on the periphery thereof at said section for indicating the angular orientation of the opening, said indicating means comprising a key integral with one of said hub and cannula and projecting into the other and discernable through the hub.

2. A needle of the class described comprising a cannula having a lumen and, at one end, a tapered penetrating point with an opening therein from the lumen and a light-pervious hub anchored thereto at a section of the cannula spaced axially from said penetrating point, said cannula having indicating means localized on the periphery thereof at said section for indicating the angular orientation of the opening, said indicating means comprising a projection integral with the cannula and embedded in the hub and discernable therethrough.

3. A needle of the class described comprising a cannula having a lumen and, at one end, a tapered penetrating point with an opening therein from the lumen and a light-pervious hub rigidly anchored thereto at a section of the cannula spaced axially from said penetrating point, said cannula having indicating means formed integrally with the periphery thereof at said section for indicating the angular orientation of the opening, said indicating means comprising a depression keyed to said hub and extending over a fractional part of the circumference of the cannula at said section with the limits thereof in a direction circumferentially of the cannula discernable through the hub.

4. A needle of the class described comprising, a cannula tapered at one end to form a penetrating point, a light pervious plastic hub molded over the cannula and keyed thereto at a section of the cannula spaced axially from said penetrating point to prevent relative rotary or axial movement of the cannula with respect to the hub, and an indicator formed integrally with the portion of the cannula keyed to the said hub for indicating the position of the tapered end of the cannula and visible through said light-pervious hub.

5. A needle of the class described comprising a cannula having a tapered penetrating point at one end and, remote from the penetrating end, having at least one portion where the outer periphery of the cannula wall extends through an area having a lateral surface displaced from the surface constituting the adjacent peripheral wall surface of the cannula and said displaced portion extending at a substantial angle to the longitudinal axis of the cannula, a hub molded over and surrounding the cannula at said displaced portion with the material of the hub forming an anchoring means with said displaced portion for keying the cannula to the hub to prevent accidental alteration of the relative positions of the hub and cannula, said hub being light-pervious and said displaced portion constituting an indicator for indicating the orientation of the penetrating point of the cannula.

6. A needle as in claim 5 wherein said displaced portion comprises a groove extending into the surface of the cannula wall a distance less than the cannula wall thickness.

7. A needle as defined in claim 5 wherein said displaced portion comprises a protuberance extending outwardly from the peripheral surface of the cannula.

8. A needle as defined in claim 5 wherein said displaced portion extends through an arc of less than 180° around the periphery of the cannula.

9. A needle according to claim 5 wherein said displaced portion comprises a plurality of depressions each of a maximum depth less than the thickness of the cannula wall, the depressions being spaced from one another axially of the cannula and in line with the penetrating point.

10. A needle according to claim 5 wherein the said displaced portion comprises a spot of material on the surface of the cannula and united with the material of the cannula in axial alignment with the penetrating point.

11. A needle according to claim 5 wherein the cannula is circular in cross section and said displaced portion comprises radially outwardly projecting means rigidly secured to the cannula.

12. A needle according to claim 5 wherein the cannula is circular in cross section and the displaced portion comprises a portion of the cannula deformed to a non-circular shape.

References Cited in the file of this patent

UNITED STATES PATENTS

| | | |
|---|---|---|
| 1,100,181 | Hart | June 16, 1914 |
| 2,512,569 | Saffir | June 20, 1950 |
| 2,665,689 | Butler | Jan. 12, 1954 |
| 2,862,495 | Gewecke | Dec. 2, 1958 |
| 2,864,365 | Szmukler et al. | Dec. 16, 1958 |
| 2,870,765 | Henderson | Jan. 27, 1959 |

FOREIGN PATENTS

| | | |
|---|---|---|
| 1,004,651 | France | Nov. 28, 1951 |